(12) United States Patent
Nakauchi

(10) Patent No.: US 8,823,950 B2
(45) Date of Patent: Sep. 2, 2014

(54) SHAPE MEASUREMENT APPARATUS, AND SHAPE MEASUREMENT METHOD

(71) Applicant: Canon Kabushiki Kaisha, Tokyo (JP)

(72) Inventor: Akihiro Nakauchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/958,682

(22) Filed: Aug. 5, 2013

(65) Prior Publication Data

US 2014/0055794 A1    Feb. 27, 2014

(30) Foreign Application Priority Data

Aug. 24, 2012    (JP) ................. 2012-185107

(51) Int. Cl.
*G01B 11/24*    (2006.01)
*G01B 21/04*    (2006.01)

(52) U.S. Cl.
CPC .............. *G01B 11/24* (2013.01); *G01B 21/045* (2013.01)
USPC ............................ 356/612; 356/601; 356/606

(58) Field of Classification Search
CPC ............................... G01B 11/24; G01B 21/045
USPC ........... 356/601–614, 621–625; 382/203, 286
See application file for complete search history.

(56) References Cited

U.S. PATENT DOCUMENTS

| | | | | |
|---|---|---|---|---|
| 4,201,475 A | * | 5/1980 | Bodlaj | 356/631 |
| 4,767,211 A | * | 8/1988 | Munakata et al. | 356/624 |
| 5,668,631 A | * | 9/1997 | Norita et al. | 356/608 |
| 5,848,188 A | * | 12/1998 | Shibata et al. | 382/203 |
| 2002/0036779 A1 | * | 3/2002 | Kiyoi et al. | 356/606 |
| 2002/0159072 A1 | * | 10/2002 | Fujii et al. | 356/601 |
| 2006/0152738 A1 | * | 7/2006 | Iwasaki | 356/602 |
| 2012/0010850 A1 | * | 1/2012 | Nakauchi et al. | 702/167 |

FOREIGN PATENT DOCUMENTS

JP    4375710 B2    12/2009
JP    2010-051983 A    3/2010

* cited by examiner

*Primary Examiner* — Sang Nguyen
(74) *Attorney, Agent, or Firm* — Rossi, Kimms & McDowell LLP

(57) ABSTRACT

A shape measurement apparatus includes a distance measurement meter configured to emit and receive the beam in relation to the object; a beam deflection mechanism configured to deflect the beam from the distance measurement meter; and a control unit configured to determine at least one of a maximum beam deflection angle due to the beam deflection mechanism and the distance between a detected surface and the beam deflection mechanism when the beam is incident perpendicularly to the detected surface of the object, so that an error of a first measurement error that depends on a change in a spot diameter of the beam on the detected surface and a second measurement error that depends on an incidence angle on the detected surface of the beam is no more than a threshold value of a permitted error.

11 Claims, 2 Drawing Sheets

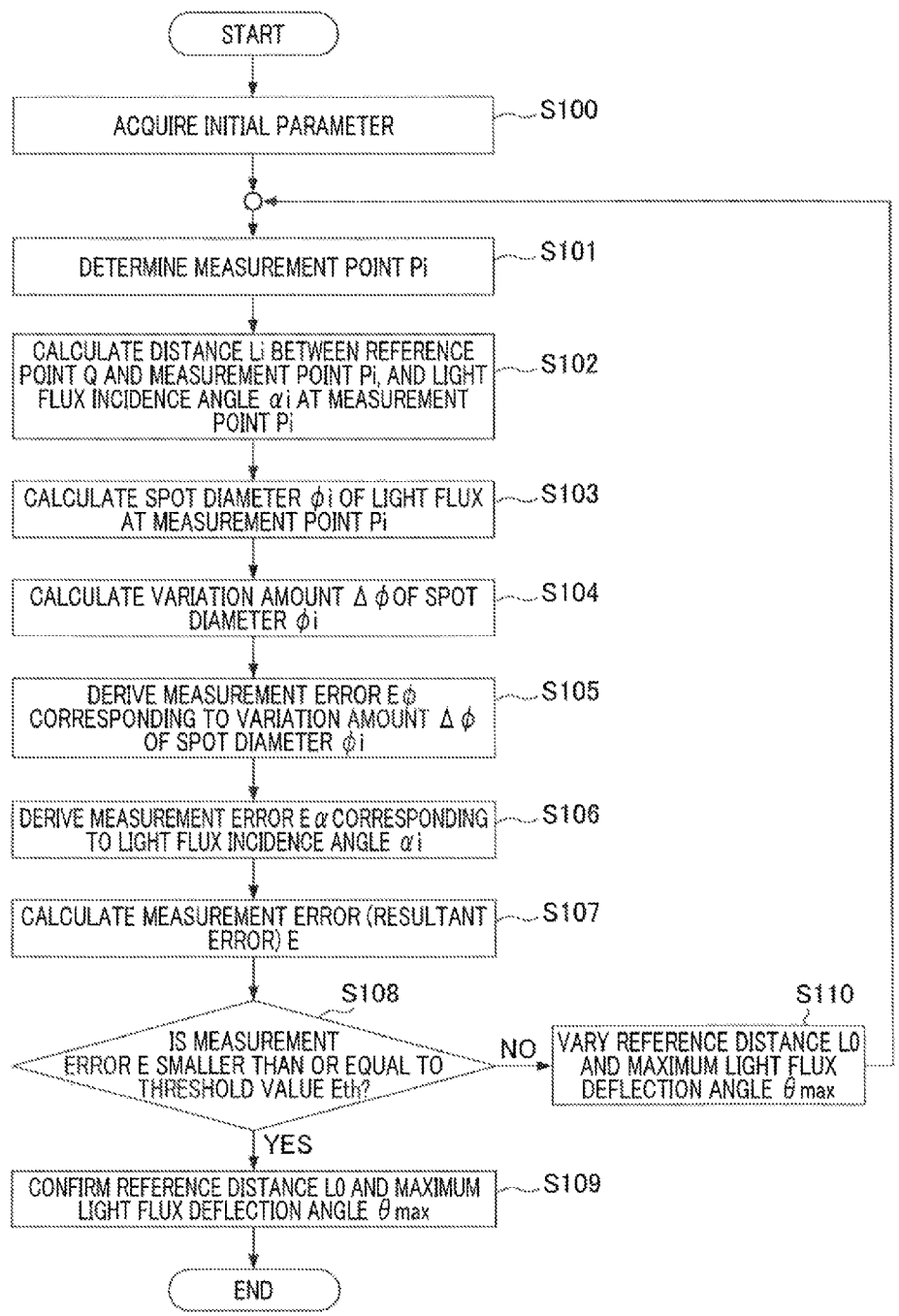

SHAPE MEASUREMENT APPARATUS, AND SHAPE MEASUREMENT METHOD

BACKGROUND OF THE INVENTION

1. Field of the Invention

The present disclosure relates to a shape measurement apparatus and a shape measurement method.

2. Description of the Related Art

There is an apparatus, for example, that illuminates laser light onto an object surface and receives laser light that is reflected from the object surface to thereby execute non-contact measurement of the three dimensional shape of the object. Japanese Patent No. 4375710 discloses this type of shape measurement device in a configuration of a three dimensional measurement apparatus that is provided with a galvanized mirror as a light flux deflection mechanism that is configured to radially deflect and scan laser light, that is illuminated towards the object surface, from a reference point. On the other hand, from the point of view of avoiding a change in measurement accuracy, a spot diameter of the laser light flux that is illuminated onto the object surface preferably exhibits the small possible fluctuation amount even when the position on the object surface changes. Therefore, Japanese Patent Application Laid-Open No. 2010-51983 discloses a manufacturing apparatus for a solid circuit substrate in which the spot diameter of the laser light flux on the object surface is fixed and a focus adjustment lens is disposed in a probe to thereby adjust a focal point of the laser light flux.

Since a radial scan with the laser light flux is executed by the light flux deflection mechanism in the three dimensional measurement apparatus disclosed in Japanese Patent No. 4375710, the incidence angle of the laser light flux onto the detected surface (object surface) changes in response to the position on the detected surface. Therefore, there is the possibility of an measurement error resulting from the spectral pattern (interference fringe) produced on a coarse detected surface, or by an amount of reflected light from a detected surface that changes in response to the incidence angle. The measurement error also changes as a result of the incidence position of the laser light flux on the detected surface. Furthermore, since the position of the beam waist of the laser light flux (distance from the distance measurement meter to the beam waist) is fixed, the spot diameter changes in response to the distance between the detected surface and the distance measurement meter. In particular, when the spot diameter on the detected surface is fixed, a deterioration in the amplitude that results from an averaging effect on the coarse component or the wave-shaped component on the detected surface can be corrected. In this regard, when the spot diameter changes, the spot diameter is adjusted to a fixed range by provision of a focal adjustment lens in the probe as adopted in the manufacturing apparatus disclosed in Japanese Patent Application Laid-Open No. 2010-51983. However, the increase in the probe size in this configuration causes an increase in the overall size of the shape measurement apparatus.

SUMMARY OF THE INVENTION

The present disclosure is proposed in light of the above circumstances and, for example, and provides a shape measurement apparatus that is useful in suppressing an effect on measurement accuracy that results from a change in the beam incidence position on a detected surface.

An aspect of the present disclosure is a shape measurement apparatus configured to measure a shape of an object to be detected by emission and receipt of a beam. The apparatus includes a distance measurement meter configured to emit and receive the beam in relation to the object; a beam deflection mechanism configured to deflect the beam from the distance measurement meter; and a control unit configured to determine at least one of a maximum beam deflection angle due to the beam deflection mechanism and the distance between a detected surface and the beam deflection mechanism when the beam is incident perpendicularly to the detected surface of the object, so that an error of a first measurement error that depends on a change in a spot diameter of the beam on the detected surface and a second measurement error that depends on an incidence angle on the detected surface of the beam is no more than a threshold value of a permitted error.

The present disclosure provides a shape measurement apparatus that is useful in suppressing an effect on measurement accuracy that results from a change in the beam incidence position on a detected surface.

Further features of the present invention will become apparent from the following description of embodiments (with reference to the attached drawings).

BRIEF DESCRIPTION OF THE DRAWINGS

FIG. 2 is a flowchart that illustrates a flow of a reference value calculation sequence.

DESCRIPTION OF THE EMBODIMENTS

Figure 1:
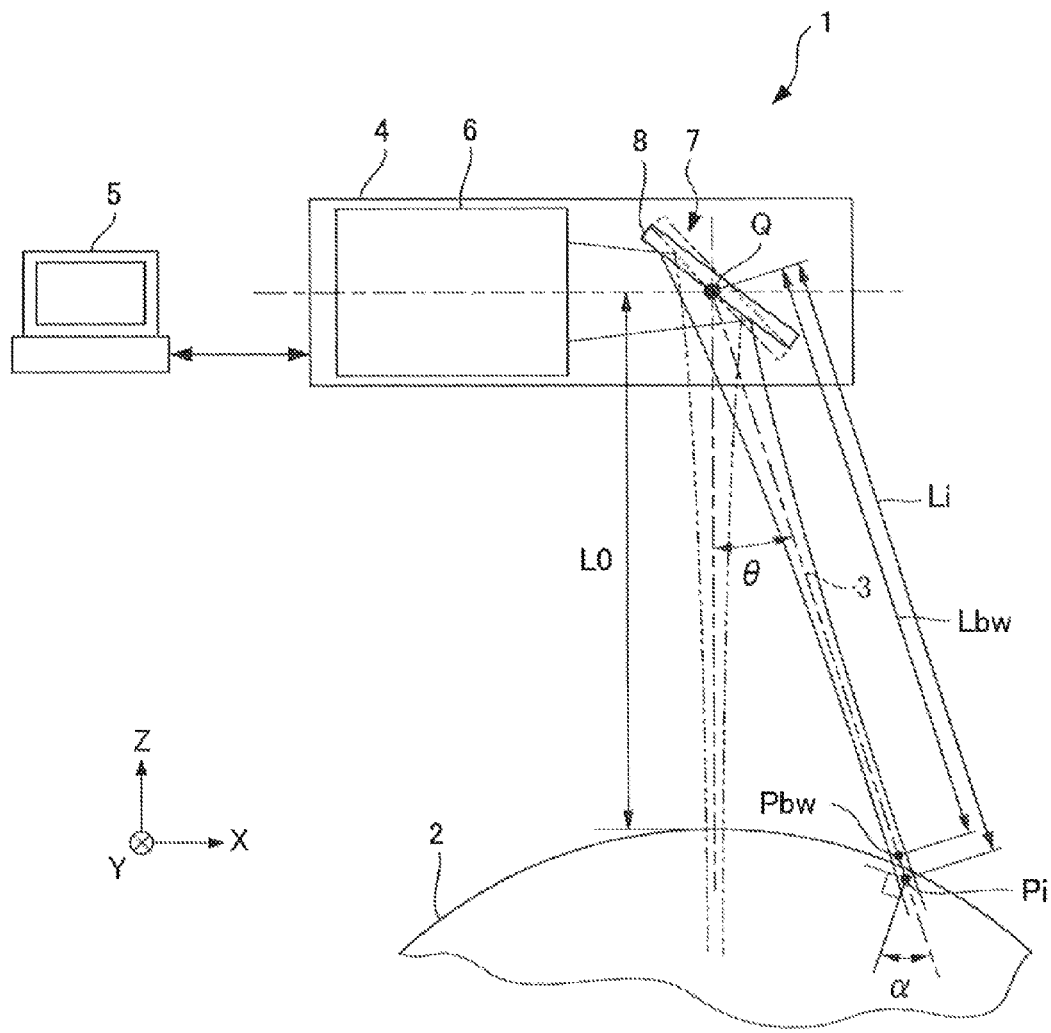
FIG. 1 illustrates a configuration of a shape measurement apparatus according to one embodiment of the present disclosure.

The embodiments for executing the present disclosure will be described below making reference to the figures.

Firstly, the configuration of a shape measurement apparatus according to one embodiment of the present disclosure will be described. FIG. 1 illustrates a configuration of the shape measurement apparatus 1 according to the present embodiment. The shape measurement apparatus 1 is configured to measure the three dimensional shape of the detected surface 2 in a non-contact configuration with the surface of the object (measured body) as the detected surface 2. As illustrated in FIG. 1, the schematic shape of the detected surface 2 in the present embodiment assumes a spherical surface or curved surface, and the object at the time of measurement is disposed (held) in a holding unit (not illustrated) to be oriented with reference to a surface that projects in the direction of emission of the a light flux 3 (a beam 3) that is emitted for the purposes of measurement. Furthermore, in FIG. 1, the X axis and the Y axis are taken to be mutually orthogonal to a plane when the object is disposed on the holding unit, and the Z axis is oriented in a perpendicular direction (a direction that is perpendicular in the present embodiment) to the XY plane that includes the X axis and Y axis. The shape measurement apparatus 1 includes a probe 4 configured to measure the shape of the detected surface 2 in a non-contact configuration, and a control unit 5.

The probe 4 includes a distance measurement meter 6 and a light flux deflection mechanism 7 (a beam deflection mechanism) therein, and is held to be moved by a drive stage (not illustrated). The distance measurement meter 6 emits and receives laser light (laser light flux (hereinafter referred to as "light flux")) 3 in relation to the detected surface 2, that is to say, the light flux 3 is illuminated onto the detected surface 2, and the reflected light reflected by the detected surface 2 is detected. The light flux deflection mechanism 7 includes a deflection member 8 configured to deflect the light flux 3 illuminated from the distance measurement meter 6 and a drive unit (not illustrated) that is configured to change the rotation position (inclination) of the deflection member 8. A galvanized mirror, for example, may be employed as the light flux deflection mechanism 7. The galvanized mirror can rotate in response to the operation of a drive unit with reference to the reference point Q to thereby deflect the light flux 3 in any angular direction. That is to say, the reference point Q is a point that coincides with the center when the direction of propagation (angle) of the light flux 3 is changed, and is the origin when determining the deflection angle (beam deflection) θ to the detected surface 2 of the light flux 3 illustrated in FIG. 1. Although the light flux deflection mechanism 7, in the present embodiment, deflects the light flux 3 in only a uniaxial direction (X axis direction), the light flux deflection mechanism 7 may deflect, for example, in both the X axis and Y axis directions. Furthermore, although the light flux deflection mechanism 7 in the present embodiment is configured so that the rotational center of the deflection member (mirror) 8 coincides with the deflection center of the light flux 3 as illustrated in FIG. 1, it may be a configuration that does not coincide. The control unit 5 is connected through wiring to the respective constituent elements of the shape measurement apparatus 1, and executes the operational control of the respective constituent elements or calculation processing in accordance with a program, or the like.

Next, the shape measurement of the object by the shape measurement apparatus 1 will be described. The control unit 5 of the shape measurement apparatus 1 causes the distance measurement meter 6 to illuminate the light flux 3 and causes the light flux deflection mechanism 7 to continuously vary the deflection angle θ of the light flux 3, after the probe 4 is disposed on an upper portion in the Z axis direction of the object. At this time, since the light flux 3 is scanned radially on the detected surface 2, the control unit 5 causes the distance measurement meter 6 to receive the reflected light at a plurality of positions on the detected surface 2 that is changed by this scanning operation, and thereby acquire a light receipt signal on each occasion. Then, the control unit 5 calculates the surface shape of the detected surface 2 based on the plurality of light receipt signals at the acquired plurality of positions.

The incidence angle (beam incidence angle) α of the light flux 3 onto the detected surface 2 changes in response to the incident position on the detected surface 2, and the detected light amount of reflected light from the detected surface 2 changes in response to the beam incidence angle α to thereby produce a measurement error. Furthermore, the measurement error itself differs depending on the position of the detected surface 2. On the other hand, the light flux 3 that is irradiated from the distance measurement meter 6 forms a beam waist on a predetermined position from the reference point Q as a result of the optical system (not illustrated) in the distance measurement meter 6. In FIG. 1, the distance Lbw denotes the distance from the reference point Q to the position Pbw at which the beam waist is formed. Since the distance Lbw is fixed, the laser beam diameter changes in response to the distance between the probe 4 and the detected surface 2, and in particular, the laser beam diameter (spot diameter φ) on the detected surface 2 also changes. The change in the spot diameter φ may also affect the measurement accuracy. In this regard, the shape measurement apparatus 1 according to the present embodiment executes normal measurement in a range in which such an effect is permitted in order to minimize the effect on the measurement accuracy including the production of a measurement error. More specifically, the control unit 5 determines in advance two reference values prior to normal measurement. The two reference values are the reference distance L0 between the probe 4 and the detected surface 2, and the maximum beam deflection angle θmax (the maximum beam deflection angle) that is the maximum deflection angle of the light flux 3 resulting from the light flux deflection mechanism 7. More specifically, as illustrated in FIG. 1, the reference distance L0 is the distance from the reference point Q to the detected surface 2 when the light flux 3 is incident in relation to the detected surface 2 perpendicularly (in an axial direction that is inclined at 90 degrees towards the detected surface 2 (Z axis direction)). On the other hand, the maximum beam deflection angle θmax is the angle that is permitted in relation to the effect on the measurement accuracy when using the deflection angle up to that time.

The reference value calculation sequence configured to determine the reference distance L0 and the maximum beam deflection angle θmax will be described below. FIG. 2 is a flowchart that illustrates a flow of a reference value calculation sequence according to the present embodiment. When starting the reference value calculation sequence, the control unit 5 firstly acquires an initial parameter (step S100). Here, the initial parameter is the detected surface shape data related to the design of the CAD data or the like for the detected surface 2, the threshold value Eth of the measurement error, the reference distance L0 and the limiting value for the maximum beam deflection angle θmax, and the look-up table related to the measurement error (hereinafter referred to as "LUT"). Among these, the detected surface shape data according to the design is used by the control unit 5 in order to recognize the general shape of the detected surface 2, and may be, for example, the shape of the detected surface 2 that may be pre-acquired by measurement that differs from the present embodiment, or by use of another measurement apparatus, in addition to CAD data. The threshold Eth may be set by an operator of the shape measurement apparatus 1, or may be determined based on information related to the manufacturing tolerances that are stated in processing information associated with the CAD data. At this time, when threshold Eth determined based on information related to the manufacturing tolerances, for example, a tolerance value of ⅓ to ⅒ may be a suitable value for the threshold Eth. The limiting value of the reference distance L0 is the operation guarantee range of the shape measurement apparatus 1, or may be determined by the size of the detected surface 2 or the driving range of the probe 4. Also, a limiting value of the maximum beam deflection angle θmax is determined by the accuracy guarantee range of the light flux deflection mechanism 7. As long as either limiting value is configured in a direction in which the value decreases, the operator may input any value. Furthermore, the LUT related to the measurement error is individual information that is unique to the shape measurement apparatus 1, and describes, for example, a measurement error that is apparatus unique and is premeasured when shipping the apparatus. The LUT related to the measurement error is dependent on the beam incidence angle α and is dependent on the change in the spot diameter φ. The control unit 5 reads the stored initial parameters that are stored in the storage unit that are present in the control unit 5 itself, or an operator of the shape measurement apparatus 1 can input or read the values from another storage unit connected to the network wiring to the control unit 5.

Next, the control unit 5 determines a plurality of measurement points (measurable points) Pi that can be measured on the detected surface 2 within the range that can be assumed in advance for the reference distance LO and the maximum beam deflection angle θmax (step S101). The suffix "i" of the measurement point Pi means the "i-th" point, and is the same in relation to the following parameters. The measurement points Pi are positioned at a suitable interval on the detected surface 2.

The control unit 5 calculates two parameters for the respective plurality of measurement points Pi that have been determined in step S101 (step S102). One of the two parameters is the distance Li between the reference point Q and the measurement point Pi, and the other is the beam incidence angle αi at the measurement point Pi. The beam incidence angle αi is calculated by the following calculation. Firstly, the coordinates of the measurement point Pi are taken to be (xi, yi, zi), the coordinates of the reference point Q are taken to be (X, Y, Z), and the vector from the measurement point Pi to the reference point Q is taken to be PiQ. The control unit 5 calculates the beam incidence angle αi by taking the inner product of the tangential vector ni of the measurement point Pi, calculated using the detected surface shape in accordance with the design of the detected surface 2 acquired in the step S100, and the vector PiQ as illustrated in Equation (1) below.

$$\cos(\alpha i) = PiQ \cdot ni / |PiQ \cdot ni| \quad (1)$$

Wherein the norm of the vector PiQ is the distance Li, and the angle from the Z axis is the beam deflection angle θ, and thus, the beam incidence angle αi depends on the reference distance LO between the probe 4 and the detected surface 2, and the beam deflection angle θ. For example, when the shape of the detected surface 2 is spherical, and the curvature radius of the detected surface 2 is denoted as R, the beam incidence angle αi is expressed by Equation (2) below.

$$\cos(\alpha i) = ((LO+R)^2 + Li^2 + R^2)/Li/R \quad (2)$$

Next, the control unit 5 calculates the spot diameter φi of the light flux 3 in relation to the respective plurality of measurement points Pi using the distance Li and the beam incidence angle αi obtained in step S102 (step S103). Here, the spot diameter φi is calculated by the following calculation. Firstly, the light flux 3 is assumed to be configured for example as a Gaussian beam, the radius of the beam waist at the beam waist position Pbw (distance Lbw) is denoted as w0, and the wavelength of the light flux 3 is λ. The control unit 5 calculates the spot diameter φi by using the propagation equation for the Gaussian beam illustrated in the following Equation (3).

$$\phi i = 1/\cos(\alpha i) \times 2 \times w0 \times (1 + (\lambda \times (Li - Lbw)/(pi \times w0^2))^2)^{0.5} \quad (3)$$

The spot diameter φi depends on the distance Li and the beam incidence angle αi. Furthermore, the distance Li and the beam incidence angle αi depend on the reference distance LO and the beam deflection angle θ. Therefore, the control unit 5 sets the variation amount of the spot diameter φi by using the distance LO and the beam deflection angle θ as parameters based on the detected surface shape data according to the design of the detected surface 2 so that the error resulting from the change in the spot diameter φi falls within the threshold value. The calculation of the spot diameter φi may be performed as a calculation for a Hermite-Gaussian beam, a Laguerre-Gaussian beam, or a Bessel beam depending on the type of laser that adopts the distance measurement meter 6, or may be calculated using geometrical optics. Next, the control unit 5 calculates the variation amount Δφ of the spot diameter φi at all measurement points Pi (step S104). The variation amount Δφ of the spot diameter φi expresses the variation amount (difference) from the spot diameter φi at the i-th measurement point Pi to the spot diameter φ(i+1) at the i+1-th measurement point P(i+1).

Next, the control unit 5 looks up the LUT related to the measurement error acquired in the step S100, and calculates the measurement error (first measurement error) Eφ corresponding to the variation amount Δφ of the spot diameter φi (step S105). Next, the control unit 5 calculates the measurement error (second measurement error) Eα corresponding to the beam incidence angle αi (step S106). At this time, the control unit 5 calculates the maximum beam incidence angle αi at all measurement points Pi, and then refers to the LUT for the measurement error acquired in the step S100 to thereby determine the measurement error Eα. Next, the control unit 5 calculates the measurement error (resultant error) E (step S107). The control unit 5 may calculate the measurement error E as E=Eφ+Eα, or may perform the calculation as the square root of the sum of the squares of Eφ and Eα. Next, the control unit 5 determines whether or not the measurement error E obtained in the step S107 is no more than the threshold value acquired in the step S100 (no more than the threshold Eth) (step S108). When the control unit 5 determines that the measurement error E is no more than the threshold value Eth (YES), the reference distance LO and the maximum beam deflection angle θmax are confirmed (step S109). On the other hand, when the control unit 5 determines that the measurement error E exceeds the threshold value Eth (NO), the value for both or only one of the reference distance LO and the maximum beam deflection angle θmax is varied (step S110). Then, the control unit 5 returns to the step S101, and repeats the calculation until the measurement error E is no more than the threshold value Eth in the determination in step S108.

The control unit 5 calculates the coordinates of the deflection reference point Q of the light flux 3 in the XYZ coordinate system illustrated in FIG. 1 based on the reference distance LO determined in the above manner, and thereby executes a normal measurement using the deflection reference point Q. when the control unit 5 deflects the angle of the light flux 3 during measurement, the control unit 5 controls the operation of the light flux deflection mechanism 7 so that beam deflection angle θ does not exceed the maximum beam deflection angle θmax that is determined in the above manner. In this manner, the shape measurement apparatus 1 can execute a normal measurement within a permitted range of effect on the measurement accuracy. Furthermore, according to the shape measurement apparatus 1 of the present embodiment, since a focal point adjustment lens or the like is not provided in the probe to adjust the focal point of the beam as disclosed in Japanese Patent Application Laid-Open No. 2010-51983, an increase in the dimensions of the probe can be avoided, and as a result, an increase in the overall dimensions of the shape measurement apparatus can be avoided. The present embodiment has described a configuration in which both of the reference distance LO and the maximum beam deflection angle θmax are determined and introduced into a normal measurement. However, in contrast, as long as the permitted range of effect on the measurement accuracy is maintained, there is no requirement to strictly determine both of the reference distance LO and the maximum beam deflection angle θmax, and only one of those values may be determined and introduced into the measurement.

As described above, according to the present embodiment, a shape measurement apparatus that is useful in suppressing an effect on measurement accuracy resulting from a change in the beam incidence position on a detected surface can be provided.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-185107 filed Aug. 24, 2012 which is hereby incorporated by reference herein in its entirety.

What is claimed is:

1. A shape measurement apparatus configured to measure a shape of an object to be detected by emission and receipt of a beam, the apparatus comprising:
   a distance measurement meter configured to emit and receive the beam in relation to the object;
   a beam deflection mechanism configured to deflect the beam from the distance measurement meter; and
   a control unit configured to determine at least one of a maximum beam deflection angle due to the beam deflection mechanism and the distance between a detected surface and the beam deflection mechanism when the beam is incident perpendicularly to the detected surface of the object, so that an error of a first measurement error that depends on a change in a spot diameter of the beam on the detected surface and a second measurement error that depends on an incidence angle on the detected surface of the beam is no more than a threshold value of a permitted error.

2. The shape measurement apparatus according to claim 1, wherein the control unit determines the threshold based on a manufacturing tolerances that are stated in management information associated with detected surface shape data related to a design of the detected surface.

3. The shape measurement apparatus according to claim 2, wherein the control unit acquires a look up table stating a measurement error that depends on a change in the spot diameter as individual information that is unique to the shape measurement apparatus, and calculates the first measurement error by reference to the look up table.

4. The shape measurement apparatus according to claim 2, wherein the control unit acquires a look up table stating a measurement error that depends on the incidence angle as individual information that is unique to the shape measurement apparatus, and calculates the second measurement error by reference to the look up table.

5. The shape measurement apparatus according to claim 1, wherein the control unit acquires a look up table stating a measurement error that depends on a change in the spot diameter as individual information that is unique to the shape measurement apparatus, and calculates the first measurement error by reference to the look up table.

6. The shape measurement apparatus according to claim 1, wherein the control unit acquires a look up table stating a measurement error that depends on the incidence angle as individual information that is unique to the shape measurement apparatus, and calculates the second measurement error by reference to the look up table.

7. The shape measurement apparatus according to claim 1, wherein the control unit calculates the incidence angle and the distance between a measurement point and a reference point for a respective plurality of measurement point on the detected surface based on a vector that is oriented from the measurement point to the reference point.

8. The shape measurement apparatus according to claim 7, wherein the control unit is configured to calculate the spot diameter based on the incidence angle and the distance between the measurement point and the reference point, and calculate a variation amount in the spot diameter based on the calculated plurality of spot diameters.

9. The shape measurement apparatus according to claim 8, wherein the control unit calculates the spot diameter based on the propagation equation for a Gaussian beam.

10. The shape measurement apparatus according to claim 8, wherein the control unit sets the variation amount of the spot diameter with parameters of the distance between the detected surface and the reference point when the beam is incident in a perpendicular configuration in relation to the detected surface of the object prior to determination based on the shape of the detected surface resulting from the design of the detected surface, and the beam deflection angle at the measurement point r so that the first measurement error is not more than the threshold value.

11. A method for a shape measurement configured to measure the shape of an object to be detected by emission and receipt of a beam, the method comprising:
   acquiring a look up table storing a measurement error;
   determining a plurality of measurement points measured on the detected surface within an assumed range of a maximum beam deflection angle and a distance between the detected surface and a reference point that is a reference when the beam is deflected with reference to the detected surface, in a configuration in which the beam is perpendicularly incident with respect to the detected surface of the object;
   calculating the distance between the reference point and the measurement point and the incidence angle of the beam for the respective plurality of measurement points;
   calculating a spot diameter of the beam based on the distance between the reference point and the measurement point, and the incidence angle, and calculating a variation amount of the spot diameter based on the calculated plurality of spot diameters;
   referring to the look up table and acquiring a first measurement error that depends on the variation in the spot diameter on the detected surface and a second measurement error that depends on the incidence angle on the detected surface; and
   determining at least one of a maximum beam deflection angle or the distance between the detected surface and the reference point when the beam is incident perpendicularly to the detected surface of the object, so that a resultant error of the first measurement error and the second measurement error is no more than a threshold value of the permitted measurement error by a control unit.

* * * * *